United States Patent [19]

Claussen

[11] Patent Number: 5,607,630
[45] Date of Patent: Mar. 4, 1997

[54] PROCESS FOR THE PRODUCTION OF FINE-GRAINED CERAMIC BODIES MOLDED CONTAINING $AL_2O_3$

[76] Inventor: Nils Claussen, Auf den Schwarzen Bergen 15, D-21224 Rosengarten, Germany

[21] Appl. No.: 307,842

[22] PCT Filed: Jan. 31, 1994

[86] PCT No.: PCT/EP94/00272

§ 371 Date: Sep. 30, 1994

§ 102(e) Date: Sep. 30, 1994

[87] PCT Pub. No.: WO94/18140

PCT Pub. Date: Aug. 18, 1994

[30] Foreign Application Priority Data

Feb. 1, 1993 [DE] Germany ............................ 43 02 721.0

[51] Int. Cl.⁶ ........................ C22C 32/00; C04B 35/58; C04B 35/03
[52] U.S. Cl. ................ 264/60; 264/65; 264/66; 419/10; 419/13; 419/14; 419/19; 501/108; 501/127; 501/89; 501/96; 501/97; 501/98
[58] Field of Search ..................... 264/60, 65, 66; 419/10, 13, 14, 19; 501/89, 96, 97, 98, 108, 127

[56] References Cited

U.S. PATENT DOCUMENTS

| | | | |
|---|---|---|---|
| 3,676,309 | 7/1972 | Dolomont | 204/27 |
| 4,587,225 | 5/1986 | Tsukuma et al. | 501/105 |
| 4,938,928 | 7/1990 | Koda et al. | 422/98 |

FOREIGN PATENT DOCUMENTS

| | | |
|---|---|---|
| 0545438 | 6/1993 | European Pat. Off. . |
| 9216472 | 10/1992 | WIPO . |

OTHER PUBLICATIONS

Journal of the American Ceramic Society, Bd. 76, Nr. 4, Apr. 1993, Westervill, Ohio, US, pp. 970–980 XP360957, S–WU et al. 'Mechanisms And Kinetics Of Reaction–Bonded Aluminum Oxide Ceramics'.

Journal of the European Ceramic Society, Bd. 5, Nr. 1, 1989, pp. 29–35 XP70883, Claussen et al., 'Low–Shrinkage Reaction–Bonded Alumina'.

Primary Examiner—Christopher A. Fiorilla
Attorney, Agent, or Firm—Felfe & Lynch

[57] ABSTRACT

A ceramic moulded body containing at least 10 vol. % fine-grained $Al_2O_3$, and a process for its production (a) milling aluminium metal in powder form alone or together with $Al_2O_3$ or/and if desired further suitable inorganic substances for ceramic formation in a non-aqueous liquid in the presence of oxygen until 10 to 80% of the metallic aluminium powder has reacted to form one or several aluminium oxidation precursors from the group amorphous $Al_2O_3$, $\gamma$-$Al_2O_3$ and aluminium-organic compounds and the powder has a maximum oxidation rate between 510° and 610° C. according to differential thermoanalytical measurement;

(b) molding the powder of step (a) into a green body;

(c) slowly heating the green body in an atmosphere containing oxygen to a temperature which is below the melting temperature of aluminium until at least 50% of the metallic aluminium powder remaining after the milling has reacted to $Al_2O_3$; and subsequently (d) sintering the moulded body at 1100° to 1650° C. or (e) applying the powder obtained in step (a) onto a substrate by means of flame or plasma spraying in the presence of oxygen.

22 Claims, 1 Drawing Sheet

PROCESS FOR THE PRODUCTION OF FINE-GRAINED CERAMIC BODIES MOLDED CONTAINING $AL_2O_3$

BACKGROUND OF THE INVENTION

The invention concerns a process for the production of fine-grained ceramic molded bodies containing $Al_2O_3$ using aluminum metal in a powder form.

Figure 1A:
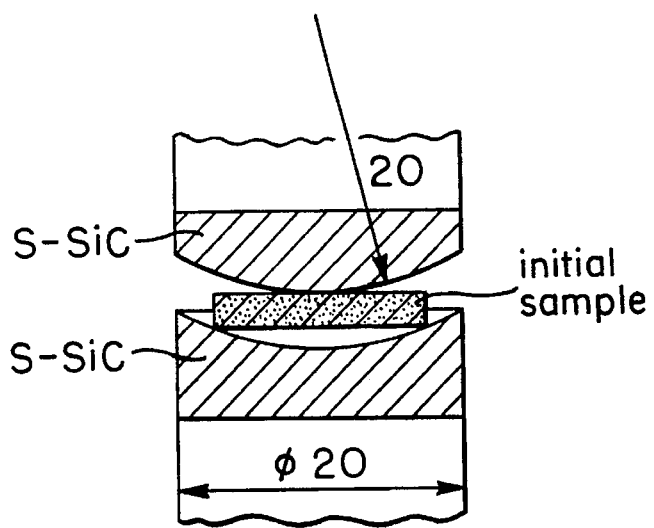
FIG. 1 illustrates a tool for reforming cylindrical disks-shaped ceramic molded bodies according to the invention.

The production of $Al_2O_3$ ceramics using metallic aluminum is known. Thus such a process is described in U.S. Pat. No. 5,024,795 which is based on directed melt oxidation. Processes are described in DE-A-38 12 266, 40 17 262, 40 39 530, 40 39 531 and 41 26 738 which are based on the principle of oxidizing mixtures of aluminum metal and $Al_2O_3$ at temperatures above the melting point of aluminum and mainly at temperatures above 900° C. Ceramic moulded bodies manufactured according to these processes are characterized by a particularly low shrinkage, high green strength and grain boundaries free of glass phases. However, a disadvantage of these processes is that it is not possible to embed oxidizable metallic shaped parts in the ceramics, in particular aluminum wires, without these being destroyed during the heat treatment. This process is also not suitable for a superplastic forming of the bodies obtained or for processing by the flame spraying process. Moreover the necessity of always having to work with an addition of $Al_2O_3$ in the known processes is a disadvantage with regard to the manufacture of particularly crack-resistant and very finely pored bodies. Thus according to the teaching of the aforementioned DE-A documents at least 50 vol. % $Al_2O_3$ is required for passivation, as an aid to sintering and for the complete conversion of the aluminum metal.

The object of the invention is therefore to create an improved process for the production of such $Al_2O_3$ ceramic moulded bodies which eliminates or reduces the aforementioned disadvantages and can also be carried out without addition of $Al_2O_3$.

This object is achieved according to the invention by a process for the production of a fine-grained ceramic molded body containing at least 10 vol. % $Al_2O_3$ which is characterized in that (a) aluminum metal in powder form is milled alone or together with $Al_2O_3$ or/and, if desired, further suitable inorganic substances for ceramic formation in a non-aqueous liquid in the presence of oxygen until 10 to 80% of the metallic aluminum powder has reacted to form one or several aluminum oxidation precursors from the group amorphous $Al_2O_3$, $\gamma$-$Al_2O_3$ and aluminum-organic compounds and the powder exhibits a maximum oxidation rate between 510° and 610° C. according to differential thermoanalytical measurement (b) the powder obtained in this manner is molded into a green body and (c) this is heated slowly in an atmosphere containing oxygen to a temperature which is below the melting temperature of aluminum until at least 50% of the metallic aluminum powder remaining after the milling has reacted to $Al_2O_3$ and subsequently (d) a sinter treatment is carried out at 1100° to 1650° C.

The invention is based on the surprising finding of a connection between the maximum oxidation rate of aluminum powder at temperature below the melting point of aluminum (660° C.) and the extremely fine granularity of the ceramic molded body obtained as an oxidation product that is achieved after oxidation by heat treatment in an oxygen-containing atmosphere. As a result of this extremely fine granularity of the ceramic molded body obtained according to the invention 1. superplastic forming of the body is possible at relatively low temperatures and pressures and 2. metallic shaped bodies such as wires and sheet bars can be embedded in the green body in step (b) which retain their shape and their metallic character in the subsequent oxidation treatment and sintering in steps (c) and (d). Steps (b), (c) and (d) of this process can also be carried out by flame spraying or plasma spraying in which the ceramic molded bodies are obtained in the form of spray layers which have a finer particle size than that which was previously obtainable.

An essential feature of the invention is the intensive wet milling of the aluminum powder carried out in step (a) of the process of the invention. Under the stated conditions the aluminum powder is submicrofinely interspersed with aluminum oxidation products. These aluminum oxidation products such as amorphous $Al_2O_3$, precursors of $\gamma$-$Al_2O_3$, $\alpha$-$Al_2O_3$ and aluminum organic compounds lead to the fact that the main portion of the metallic aluminum powder remaining for the molding is already oxidized to $Al_2O_3$ during a heat treatment in an oxygen-containing atmosphere before the melting temperature of the aluminum metal (660° C.), the prerequisite being that the maximum oxidation rate occurs between 510° and 610° C., preferably between 530° and 580° C.

The suitable milling conditions can be determined by carrying out a differential thermoanalytical (DTA) measurement in air on the product obtained over a temperature range of 0° C. to 1000° C. and determining the maximum for the oxidation rate. This DTA method is described in Encyclopedia of Materials Science and Engineering (M. B. Bever), vol. 7, pp 4902 to 4909, Pergamon Press Ltd. London, 1986. The intensive wet milling in step (a) of the method according to the invention is carried out in a non-aqueous liquid. In principle all non-aqueous liquids come into consideration, for example alcohols such as methanol, ethanol and isopropanol, ketones such as acetone, methyl ethyl ketone and diethyl ketone, aliphatic and aromatic hydrocarbons such as n-hexane, toluene, amines, heterocycles etc. The suitability of a solvent as a milling liquid within the scope of the invention as well as the milling conditions for achieving the maximum oxidation rate in the given temperature range can easily be determined by simple preliminary experiments.

Suitable milling devices are for example high-energy ball mills, preferably a bead mill or an attrition mill.

The duration of the milling treatment depends on the type of milling device used, the non-aqueous milling liquid as well as on the type and composition of the powder to be milled. If for example spherical aluminum powder is milled for 12 hours in a bead mill with $ZrO_2$ balls as milling balls and ethanol, isopropanol or acetone, then oxidation precursors of aluminum and a maximum oxidation rate are obtained in the scope of step (a). Generally the criteria of step (a) are achieved reliably with milling periods between 0.5 and 20 hours, preferably 2 to 12 hours, and using spherical or platelet-like Al powder. The milling treatment is preferably carried out until 10 to 60% of the aluminum powder used is reacted to oxidation precursors of aluminum.

In addition to a reduction in the size of the aluminum powder used, the intensive wet milling in air according to the invention also achieves a fine inner and outer oxidation of the aluminum metal during which, depending on the type and duration of the milling, 10 to 80% of the metallic aluminum used reacts to form the aforementioned aluminum oxidation precursors which are present in the form of a very finely divided dispersion. It is important in this connection that the peak of the DTA curve is found in the range between 510° and 610° C. This is the prerequisite for the formation, during the oxidation, of the desired submicrofine, very finely pored bodies containing $Al_2O_3$ at temperatures below the melting point of aluminum.

Within the scope of the process according to the invention, it is possible to use, mill, oxidize and if desired, sinter aluminum metal in powder form alone without any type of additives. However, small additions of fine-grained (<1 μm) $\alpha$-$Al_2O_3$ and $\alpha Fe_2O_3$ or MgO, have a favorable effect on the oxidation and compression properties. It is preferable to add 0.5 to 15 vol. % powder from the group $\alpha$-$Al_2O_3$ and $\alpha$-$Fe_2O_3$ with particle diameters below 1 μm as an aid to nucleation and sintering.

The molded body according to the invention also represents a suitable matrix in which other substances can be embedded or reacted therein. For this purpose one can add 2 to 80 vol. % relative to the total mixture of ceramic, metallic or metal-containing substances or compounds in the form of particles or organometallic liquids to the aluminum powder before, during or also after the milling treatment. The added components preferably consist of one or several of the following elements or compounds: Li, Na, K, Ca, Sr, Ba, Al, Y, La, Ti, Zr, Nb, Ta, Zr, Co, Cu, Ni, Si as well as their oxides, carbides, nitrides or possibly organic or inorganic compounds. These additives can for example facilitate the fine granularity of the $Al_2O_3$ structure that forms, or form phases containing $Al_2O_3$ (e.g. mullite formation) or act as strengtheners (SIC, TIC). Al is preferably added in the form of $\alpha$-$Al_2O_3$, $\beta$-$Al_2O_3$, $\gamma$-$Al_2O_3$.

In step (b) of the process according to the invention the intensively wet milled powder in step (a) is molded in a known manner to form a green body. The molding is preferably carried out by isostatic pressing. However, other conventional green body molding processes can be used in the same manner within the scope of the invention.

In step (c) of the process the green body is slowly heated in an oxygen-containing atmosphere to a temperature that is below the melting temperature of aluminum of 660° C., the heating rate or/and holding period at such a temperature being selected such that at least 50% of the metallic aluminum powder remaining after the milling reacts to form $Al_2O_3$. A preferred heating rate is between 0.01° and 5° C. per minute. At heating rates between 0.1° and 1° C. per minute, the required conversion rate of the aluminum metal is usually achieved without further measures. When operating at 3° to 5° C. per minute or more, it is usually necessary to heat for a further 1 to 20 hours at a temperature between 510° and 600° C. until the desired oxidation is achieved. The particularly preferred heating rate without a holding period for step (c) is 0.5° to 1.0° C. per minute, the heating being to temperatures of about 550° to 610° C.

The heating in step (c) described above is followed by a sintering step which is carried out at 1100° to 1650° C. For this purpose after step (c) it is heated to the selected sinter temperature at heating rates which are preferably between 1° and 20° C. per minute. The sinter treatment is preferably carried out at temperatures between 1300° and 1600° C.

Preferred compounded powders for the process according to the invention contain 50 to 95 vol. % aluminum powder, 5 to 35 vol. % $\alpha$-$Al_2O_3$, 0 to 20 vol. % $Zr_2O_3$, 0 to 20 vol. % SiC.

Moulded bodies manufactured according to the invention have an extremely pronounced fine granularity after step (c) with particle sizes below 1 μm, preferably below 0.25 μm. The bending strength of the molded body obtained after step (c) reaches values of over 600 MPa and densities, expressed in percent of the theoretical density (% TD), between 88 and 98. After step (d) one obtains particle sizes of about 1 μm i.e. ca. 0.1 to 2 μm.

Typically isostatically pressed green bodies which contain additives of 10 vol. % $Zr_2O_3$ and 20 vol. % $\alpha$-$Al_2O_3$, have a density of 91%, an average pore size below 0.1 μm and an average grain size below 0.25 μm after heating at 0.5° C. per minute from room temperature to 600° C. in air and subsequently sintering with a heating rate of 5° C. per minute to 1350° C. with a 2 hour holding period. Despite their relatively low density, these bodies have strengths of at least 200 MPa and due to these properties are ideally suited for further superplastic forming. Thus for example disk-shaped molded bodies manufactured from them of 15 mm diameter and 3 mm thickness were molded with a sintered SiC tool comprising a synclinal die (radius of the circular depression 20 mm) and a stamp also of 20 mm radius on the pressure side into dishes of 2.5 mm wall thickness. These dishes subsequently have a density of over 28% TD and strengths of more than 1000 MPa. The average pressures required for this were below 100 MPa at a temperature of 1400° C. and a forming rate of $5 \times 10^{-3}$ per second. A similar reforming was obtained with bodies that contained 20 vol. % fine (<5 μm) SiC powder.

The superplastic forming can generally be carried out at temperatures between 1100° and 1500° C. and pressures between 20 and 200 MPa. It allows a higher densification of the preform and a near-net-shape.

As a result of the high oxidation rate of the powder obtained in step (a) of the invention, it is possible to process this according to a modification of the process according to the invention by flame spraying. Thus an Al powder containing 35 vol. % $\alpha$-$Al_2O_3$ was flame sprayed in air on a steel substrate. 2 mm thick spray layers were obtained which only contained traces of non-oxidized Al. It was possible to also convert this aluminum fully into $Al_2O_3$ without formation of cracks by a short reannealing (30 minutes) in air at 1250° C.

If a milled green powder according to the invention is further processed by flame spraying (or plasma spraying), then it may be expedient to subject the milled green powder to an agglomeration treatment before the spraying. If a reoxidation of the spray layer or spray body obtained in this manner in an oxygen-containing atmosphere is desired, then it is expedient to use temperatures between 510° and 1500° C.

A further surprising effect of the process according to the invention is that fine metal bodies, for example Al wires of 100 μm, can be embedded in the green body without them being oxidized during the heat treatment and sintering in steps (c) and (d). For example fine 100 μm Al wires were embedded in an isostatically pressed green body according to step (b) of the process according to the invention. After an annealing treatment as described above for the superplastically mouldable bodies, these wires were preserved completely in the metallic form. Even an additional annealing treatment in air at 1500° C. for 2 hours did not change the metallic form. The same result was obtained when 200 μm copper wires were embedded instead of the 100 μm Al wires. Therefore the process according to the invention is suitable for co-firing (common sintering) of structural elements containing $Al_2O_3$ with metallic inclusions e.g. in the form of electrical conductors or ducts. The metallic inclusions such as copper or aluminum wires that are only covered by a very thin oxide skin are exposed by grinding to a depth of a few μm thus enabling a simple contact to be made.

Conducting paths comprised of wires or sheet bars which are in turn composed of Al, Cu, Ag, Au, Fe, Co, Ni or their alloys are particularly suitable as metallic inclusions.

Due to the properties described above, the ceramic molded bodies according to the invention are particularly suitable as construction elements in the construction of machines and apparatuses, as cutting tools and in a thermostable form in foundry technology for example in steel casting. If the process is carried out by flame or plasma spraying, one obtains particularly wear-resistant and corrosion-resistant layers. When metallic shaped bodies are embedded, the products are suitable as contacting elements in electronic components, conductive and temperature-stable channelling elements for the transmission of measured signals and power.

It will be understood that the specification and examples are illustrative but not limitative of the invention and that other embodiments within the spirit and scope of the invention will suggest themselves to those skilled in the art.

EXAMPLE 1

250 g of a powder mixture composed of 95 vol. % Al powder (Alcan 105, 20 to 50 μm) and 5 vol. % α-$Al_2O_3$ (Taimei, Japan<0.2 μm) was intensively milled for 12 hours in a bead mill using 2 mm $ZrO_2$ milling balls (3Y-TZP, Tosoh, Japan) in acetone in a circulation process with an air supply. Afterwards the mixture was dried in a rotary drier and pressed isostatically at pressures between 100 and 900 MPa into sample rods of 5×5×40mm$^3$. A differential-thermoanalytical measurement in air in a DTA apparatus (Netzsch, 409) gave, in the case of samples that were isopressed at 200 MPa, a maximum oxidation rate at 575° C. whereby 67 vol. % of the metallic Al remaining after the milling was oxidized before the melting temperature of Al (660° C.) (this can be determined inter alia from the total increase in weight which is measured concurrently in the DTA apparatus).

Cylindrical disks (15 mm diameter, 3 mm thick) were isostatically pressed at 200 MPa from the milled powder and heated in air at 0.5° C. per minute to 580° C., they were held at this temperature for 2 hours and subsequently heated at 2° C. per minute to 1500° C. and held at this temperature for 1 hour.

The samples had a density of 93.5% TD, a particle size of<1 μm and a pore size of<0.1 μm. The bend strength (ball-on-ring) of the disk ground to 2 mm thickness was 440 MPa.

EXAMPLE 2

Figure 1B:
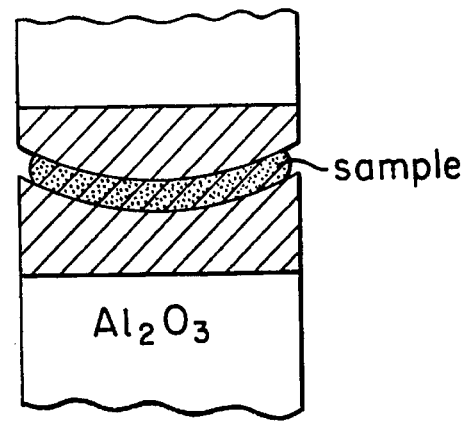

After the 2 hour annealing at 580° C. in air the samples from example 1 were heated at a rate of 5° C. per minute to 1350° C. and held at this temperature for 1 hour. Their density was subsequently 89% TD and their strength 230 MPa. These samples were reformed at 1400° C. and an average pressing pressure of<60 MPa in a sintered SiC tool (FIG. 1) composed of a lower die with a depression (20 mm radius) and an upper stamp (also of 20 mm radius) into dish-shaped bodies of ca. 2.5 mm thickness. The surfaces of the tool were coated with BN. The molding rate was 4×10$^{-3}$ per second in this case. The average grain size increased slightly from 0.3 to 0.6 μm and the density was 98.5% TD. A strength (ball-on-ring) of 870 MPa was measured on disk-shaped samples of 12.5 diameter and 1 mm thickness that were worked out from the dish bodies.

EXAMPLE 3

As in example 1, powder mixtures of 70 vol. % Al powder, 20 vol. % α-$Al_2O_3$ and 10 vol. % $ZrO_2$ (2Y-TSP, Tosoh, Japan) were milled and dried, subsequently pressed into disks at 300 MPa and heated at 0.5° C. per minute to 600° C. and afterwards heated to 1350° C. at 5° C. per minute without a holding period and held at this temperature for 2 hours. The density was subsequently 91% TD with an average grain size of<0.25 μm. These samples were molded as in example 2 at 1400° C., a rate of 5×10$^{-3}$ per second and a pressure of<60 MPa. The density of 1 mm thick disks (ca. 12.5 mm in diameter) ground from dishes molded in this way was 99% TD and the strength was 1360 MPa.

EXAMPLE 4

250 g of a powder mixture composed of 75 vol. % Al, 20 vol. % $ZrO_2$ and 5 vol. % α-$Fe_2O_3$ powder (Ventron Chemie, <0.1 μm) was intensively milled for 15 hours as in example 1 during which 20 vol. % SiC (Norton, USA, 5 μm) relative to the total mixture was added after 14 hours and jointly milled for a further hour. The subsequent procedure was as in example 3. After the reforming into dishes, the strength was 630 MPa, the structure also having quantities of mullite in addition to $ZrO_2$, α-$Al_2O_3$ and SiC.

EXAMPLE 5

As in example 1, a powder mixture of 50 vol. % Al, 15 vol. % $ZrO_2$ and 35 vol. % α-$Al_2O_3$ was milled, dried and subsequently pressed at 300 MPa into rods having the dimensions 24×4×4 mm$^3$. DTA measurements yielded a maximum oxidation rate at 545° C. with an oxidation of over 70% at temperatures<660° C.

The pressed rods were heated in a muffle furnace in air at 1° C. per minute to 560° C., held there for 2 hours and subsequently heated at 10° C. per minute to 1300° C. and afterwards further heated at 2° C. per minute to 1550° C. Afterwards their density was 96.5% TD and their strength 580 MPa.

EXAMPLE 6

The powder from example 5 was milled for 7 hours in an attrition mill (Netzsch, 0.75 l) in isopropanol with 2 mm $ZrO_2$ balls. The maximum oxidation rate in the samples treated in the same way as in example 5 was 530° C., 90% of the remaining Al being oxidized before the melting temperature of Al.

EXAMPLE 7

100 μm aluminum wires were embedded in green samples made of the powder of example 6 (isostatic pressing pressure 300 MPa). These samples were heated in a muffle furnace at 1° C. per minute to 560° C., afterwards at 2° C. per minute to 660° C. and subsequently at 5° C. per minute to 1500° C. at which they were held for 1 hour. Ground sections of these samples showed that the aluminum wires were present in an unchanged form i.e. were also present as metallic Al in the $Al_2O_3$—$ZrO_2$ matrix. The wires remained unchanged even after 10 hours annealing period in air at 1500° C. although they were in a molten form during this period.

EXAMPLE 8

Spherical Al particles (Alcan 105) of the sieve fraction 25 to 30 μm were mixed with the powder from example 6. After the same treatment as in example 7 they were also present in an unchanged form. After 1 hour annealing in air at 1500° C. (as in example 7) these samples exhibited a closed porosity so that they could be hot isostatically re-densified (HIP) at 1500° C. in Ar for 30 minutes without encapsulation. Even after this treatment changes to the Al balls were only negligible.

EXAMPLE 9

200 μm copper wire was embedded as in example 7 into the powder mixture from example 6 instead of Al wire. After a sinter treatment as in example 7, the copper wires were only insubstantially changed. They could be exposed by a short polishing of the sample surface.

EXAMPLE 10

The powder from example 6 was sprayed onto a steel substrate in air using a flame spraying pistol. The layer which still contained small amounts of non-oxidized Al could be completely oxidized by an annealing treatment at 1250° C. Its structure was considerably more finely-grained (<0.5 μm) than conventionally sprayed $Al_2O_3$ powder.

I claim:

1. A process for the production of a fine-grained ceramic molded body containing a least 10 vol. % $Al_2O_3$, comprising:
   (a) milling aluminum metal in powder form alone or together with $Al_2O_3$ and/or suitable inorganic substances for ceramic formation in a non-aqueous liquid in the presence of oxygen until 10 to 80 vol. % of the metallic aluminum powder has reacted to form one or several aluminum oxidation precursors selected from the group consisting of amorphous $Al_2O_3$, $\gamma$-$Al_2O_3$ and aluminum-organic compounds and the powder exhibits a maximum oxidation rate between 510° and 610° C. according to differential thermoanalytical measurement;
   (b) molding the milled powder of (a) into a green body;
   (c) slowly heating the molded green body in an atmosphere containing oxygen to a temperature which is below the melting temperature of aluminum until at least 50 vol.-% of the metallic aluminum powder remaining after the milling has reacted to $Al_2O_3$; and, subsequently
   (d) sintering the molded green body at a sintering temperature of 1100° to 1650° C.

2. The process of claim 1 wherein the milling of step (a) is carried out until the maxium oxidation rate of the powder is between 530° and 580° C. according to differential-thermoanalytical measurement.

3. The process of claim 1 wherein the non-aqueous liquid is at least one of an aliphatic alcohol, an aliphatic ketone or an aliphatic or aromatic hydrocarbon.

4. The process of claims 3 wherein the non-aqueous liquid is or contains a heterocyclic.

5. The process of claim 1 wherein the milling is carried out in a bead mill or an attrition mill.

6. The process of claim 1 wherein the milling is carried out for 0.5 to 20 hours.

7. The process of claim 1 wherein at least one fine-grained powder selected from the group consisting of $\alpha$-$Al_2O_3$, $\alpha$-$Fe_2O_3$ and MgO is added to the aluminum powder.

8. The process of claim 7 wherein the at least one fine-grained powder is added in an amount of 0.5 to 15 vol. %.

9. The process of claim 7 wherein the fine-grained powder is below 1 μm.

10. The process of claim 1 wherein, an additive of one or more ceramic or metallic substances or of substances containing metal in the form of particles or metallo-organic liquids are added to the aluminum powder before, during or after the milling in an amount of 2 to 80 vol.-% relative to the total of the additive and the powder.

11. The process of claim 10 wherein the one or more added substances are composed of at least one of (i) the elements Li, Na, K, Mg, Ca, Sr, Ba, Al, Y, La, Ti, Zr, Nb, Ta, Fe, Co, Cu, Ni, Si;
   (ii) oxides of (i);
   (iii) carbides of (i); and
   (iv) nitrides of (i).

12. The process of claim 1 wherein the milling is carried out until 10 to 60 vol.-% of the aluminum powder has reacted to aluminum oxidation precursors.

13. The process of claim 1 wherein the green body is molded by isostatic pressing.

14. The process of claim 1 wherein the molded green body is heated at a rate between 0.01° and 5° C./min.

15. The process of claim 14 wherein the molded green body is heated at a rate between 0.1° and 1° C./min.

16. The process of claim 14 wherein the molded green body is heated at a rate of 3° to 5° C./min and further comprises subsequently heating the body at a temperature between 510° and 600° C. for 1 to 20 hours.

17. The process of claim 1 wherein the sintering is at 1300° to 1600° C.

18. The process of claim 1 wherein the molded green body is heated at a rate between 1° and 20° C./min to the sintering temperature.

19. The process of claim 1 wherein the sintered molded body is superplastically formed at a temperature between 1100° and 1500° C. and at a pressure between 20 and 200 MPa.

20. The process of claim 1 further comprising embedding fine metal bodies in the green body.

21. The process of claim 1 comprising embedding wires or sheet bars composed of Al, Cu, Ag, Au, Fe, Co, Ni or their alloys in the green body.

22. The process of claim 1 wherein in step (b) a green powder composed of 50 to 95 vol. % aluminum powder, 5 to 35 vol.-% $\alpha$-$Al_2O_3$, 0 to 20 vol.-% $Zr_2O_3$ and 0 to 20 vol.-% SiC is used.

* * * * *